United States Patent [19]

Beattie et al.

[11] Patent Number: 4,543,114
[45] Date of Patent: Sep. 24, 1985

[54] PIPELINE CONCAVE STRAINER

[75] Inventors: David L. G. Beattie; Herbert Bear, both of Edmonton, Canada; Robin B. Willis, Houston, Tex.

[73] Assignee: Porta-Test Systems, Ltd., Edmonton, Canada

[21] Appl. No.: 547,533

[22] Filed: Oct. 31, 1983

[51] Int. Cl.[4] ............................................. B01D 35/02
[52] U.S. Cl. ...................................... 55/418; 55/505; 210/446; 210/459; 210/498
[58] Field of Search ............... 210/446, 451, 455, 459, 210/460, 497.01, 498, 499, 497.2, 532.1, 536; 55/307, 445, 432, 433, 418, 505

[56] References Cited

U.S. PATENT DOCUMENTS 549,390 11/1895 Patterson et al. ................. 210/447
2,202,403 5/1940 Sandberg ........................... 210/445
3,811,659 5/1974 Taylor et al. ...................... 210/446

Primary Examiner—Richard V. Fisher
Assistant Examiner—Wanda L. Millard
Attorney, Agent, or Firm—Millen & White

[57] ABSTRACT

A strainer is provided for removing debris from the gas flow in a pipeline. The strainer is designed with a view to minimizing the pressure drop across it. More particularly, the strainer comprises a spherical shell having inlet and outlet means which are connectable into the pipeline. A circular, concave, perforated plate is mounted within the shell and extends transversely across the path of the gas flow. The plate functions to retain debris in the flow. The combination of the spherical shell and the concave provides a relatively large "trapping" area having a relatively large number of perforations. As a result, the pressure drop across the plate is small compared to prior art strainers. In addition, the inlet means is tubular and conical in configuration, so that the entering flow assumes a divergent pattern. This arrangement results in a reduced pressure drop at the inlet and across the plate.

4 Claims, 5 Drawing Figures

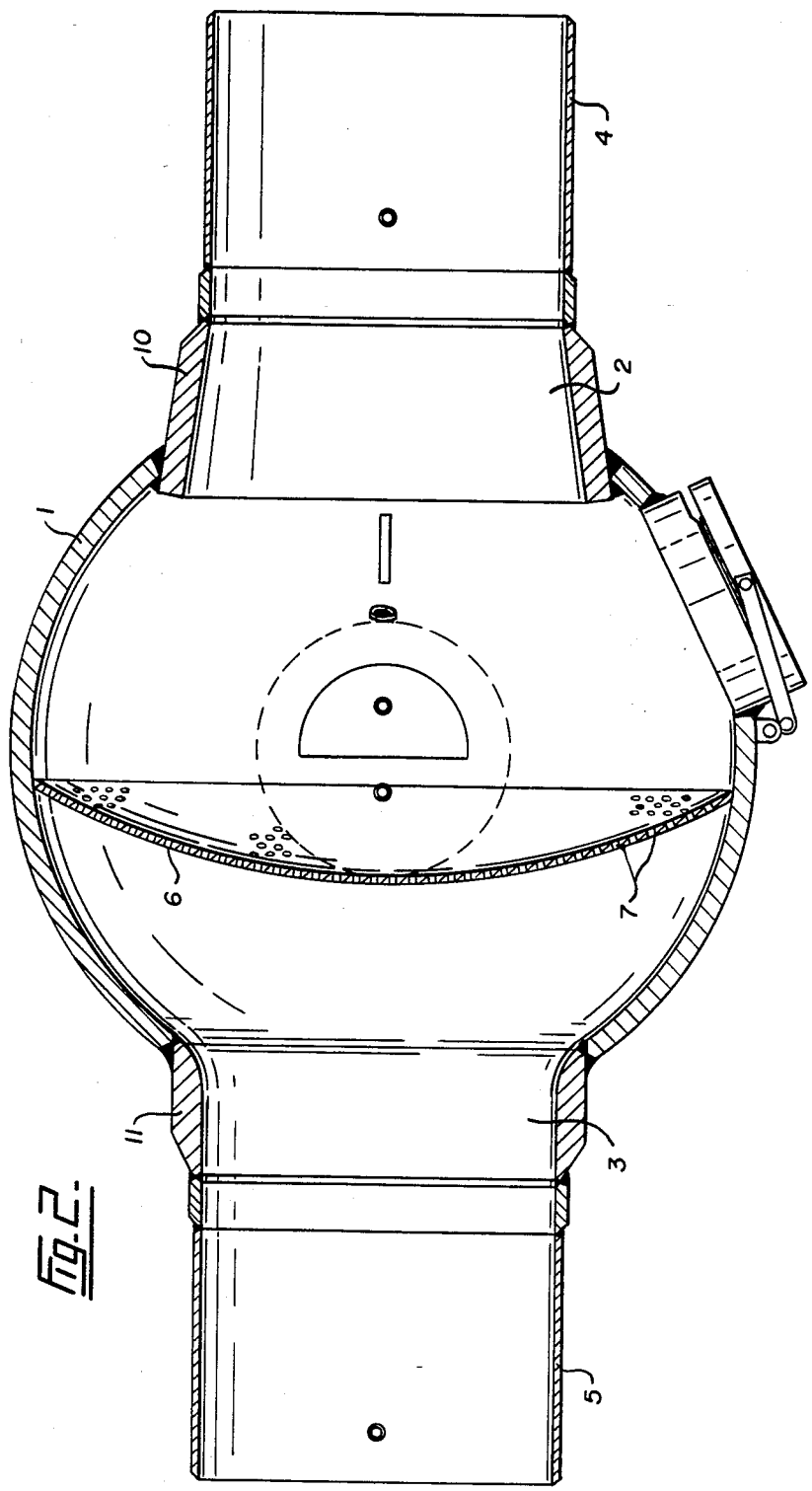

PIPELINE CONCAVE STRAINER

BACKGROUND OF THE INVENTION

1. Field of the Invention

This invention relates to a strainer for use in high pressure gas pipelines. The strainer provides a means for removing debris, such as welding slag, from the gas flow. The pipeline strainer permits of the collection of said debris and subsequent removal thereof.

2. Prior Art

There exists a number of commercial pipeline strainers in use, the two most pertinent of which are described herein and illustrated schematically in FIGS. 1(a) and 1(b).

The version shown in FIG. 1(a) comprises a perforated cylindrical basket a, closed at its downstream end, mounted vertically within a cylindrical shell b. The gas is introduced axially into the basket a through an inlet pipe c and then changes direction and passes through the perforations d into the annular space e between the basket and the shell. The debris is thus screened out of the flow and retained inside the basket, whilst the gas turns through the perforations and exits through an outlet conduit f into the pipeline (not shown).

The second pipeline strainer of interest is shown in FIG. 1(b). The strainer comprises a cylindrical shell p, inside which is mounted a transverse, perforated, flat plate q. The debris is screened from the flow by the plate q and drops into a collection sump r, from which it may be removed.

The primary disadvantage of these prior art devices lies in the substantial pressure drop across the complete strainer unit under operating conditions. This pressure drop can be as high as ten p.s.i. Having such a significant pressure drop is undesirable, because it increases the cost of subsequent re-compression of the gas.

In addition, these strainers are relatively expensive to build, due to their configuration.

There is therefore a need for a strainer characterized by a relatively low pressure drop and having a configuration or structure which lends itself to a relatively low manufacturing cost.

SUMMARY OF THE INVENTION

In accordance with the present invention, there is provided a strainer which comprises a substantially spherical vessel or shell. This shell has generally aligned, generally tubular inlet and outlet means, for connection respectively with the upstream and downstream ends of a pipeline. A substantially circular, concave, perforated plate extends across the interior of the shell, transverse to the direction of flow of the gas passing between the inlet and outlet means. The plate functions to retain debris entrained in the gas, while the gas itself passes through the perforations and continues into the downstream end of the pipeline.

The combination of a spherical shell and a concave plate provides a relatively large "trapping" surface having a relatively large number of perforations of the appropriate size. Relative, that is, to the aforementioned prior art strainers. As a result of providing a large number of perforations, generally aligned with the direction of the flow, the pressure drop across the plate is relatively small.

In addition, the spherical nature of the shell permits of the use of a thinner steel wall thickness, as compared to the case of a cylindrical shell. This leads to a reduction in the cost of the strainer.

The inlet means, which connects the strainer with the pipeline, is a conical, tubular member having its smaller diameter at the upstream pipeline end. The inlet means is operative to cause the gas flow to diverge or expand as it enters the strainer, thereby distributing the gas over the surface of the plate. Because of the concavity of the plate, the axes of the perforations are generally aligned with the direction of this diverging flow. As a result, the pressure drop across the plate is relatively small, because the gas flow does not have to change direction appreciably to pass through the perforations.

Preferably, the angularity of the conical member wall (relative to its longitudinal axis) is about $7\frac{1}{2}°$ or less. Testing has shown that if the angularity is significantly greater, the gas flow becomes turbulent adjacent the inside surface of the member, with an attendant pressure drop.

In another preferred feature, the outlet means is belled at its inner end so as to provide a smooth curved junction with the shell wall. In this manner, pressure drop at this point is kept low.

The background testing, which preceded the conception of the present invention, indicated that pressure drops were associated with:
- changes in gas flow direction
- an insufficient total area of openings in the plate
- and constrictions and sharp corners at the inlet and outlet.

The present design has been directed toward minimizing these pressure drops.

Broadly stated, the invention is a pipeline strainer, to be incorporated in a pipeline, which comprises: a substantially spherical vessel having generally aligned inlet and outlet means adapted for connection with the pipeline ends; and a substantially circular concave perforated plate extending transversely across the interior of the vessel and positioned between the inlet and outlet means, whereby the gas flow through the pipeline may pass through the perforated plate but debris carried by the gas is retained by said plate; said inlet means being a generally tubular, conical member connecting the upstream pipeline end with the interior of the vessel, whereby the gas flow diverges as it moves from the pipeline into the vessel.

DESCRIPTION OF THE DRAWINGS

FIG. 2 is a sectional top view of the strainer connected into a pipeline;

DESCRIPTION OF THE PREFERRED EMBODIMENT

Figure 1A:
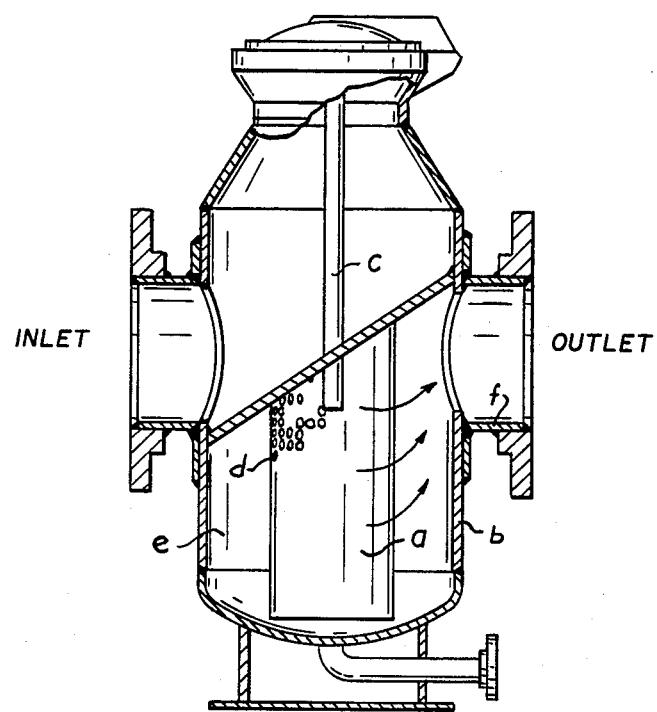
FIGS. 1(a) and 1(b) show prior art strainers.
Figure 4:
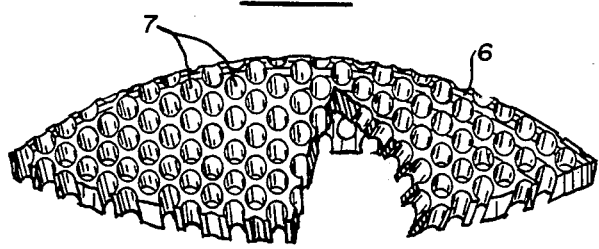
FIG. 4 is a perspective, partly broken away, view of the trapping plate.
Figure 1B:
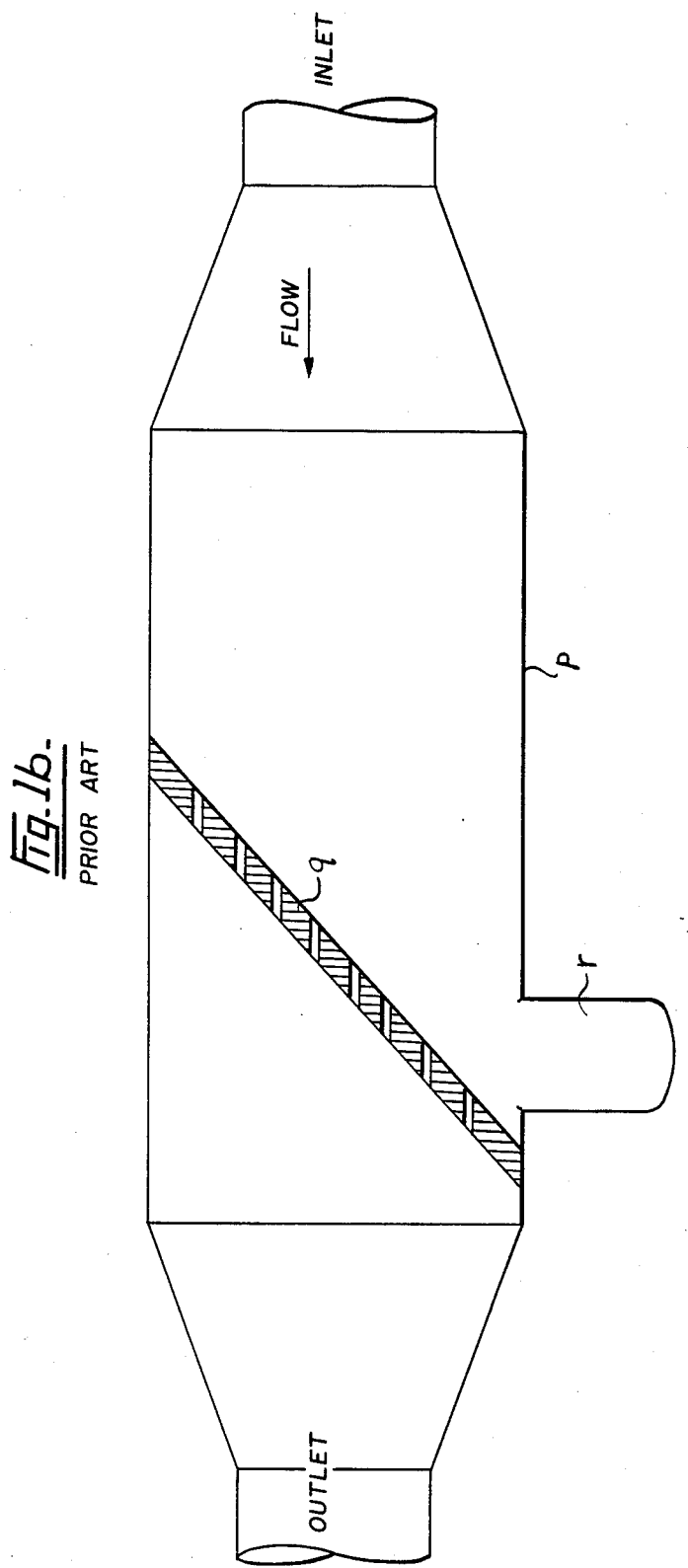
Figure 3:
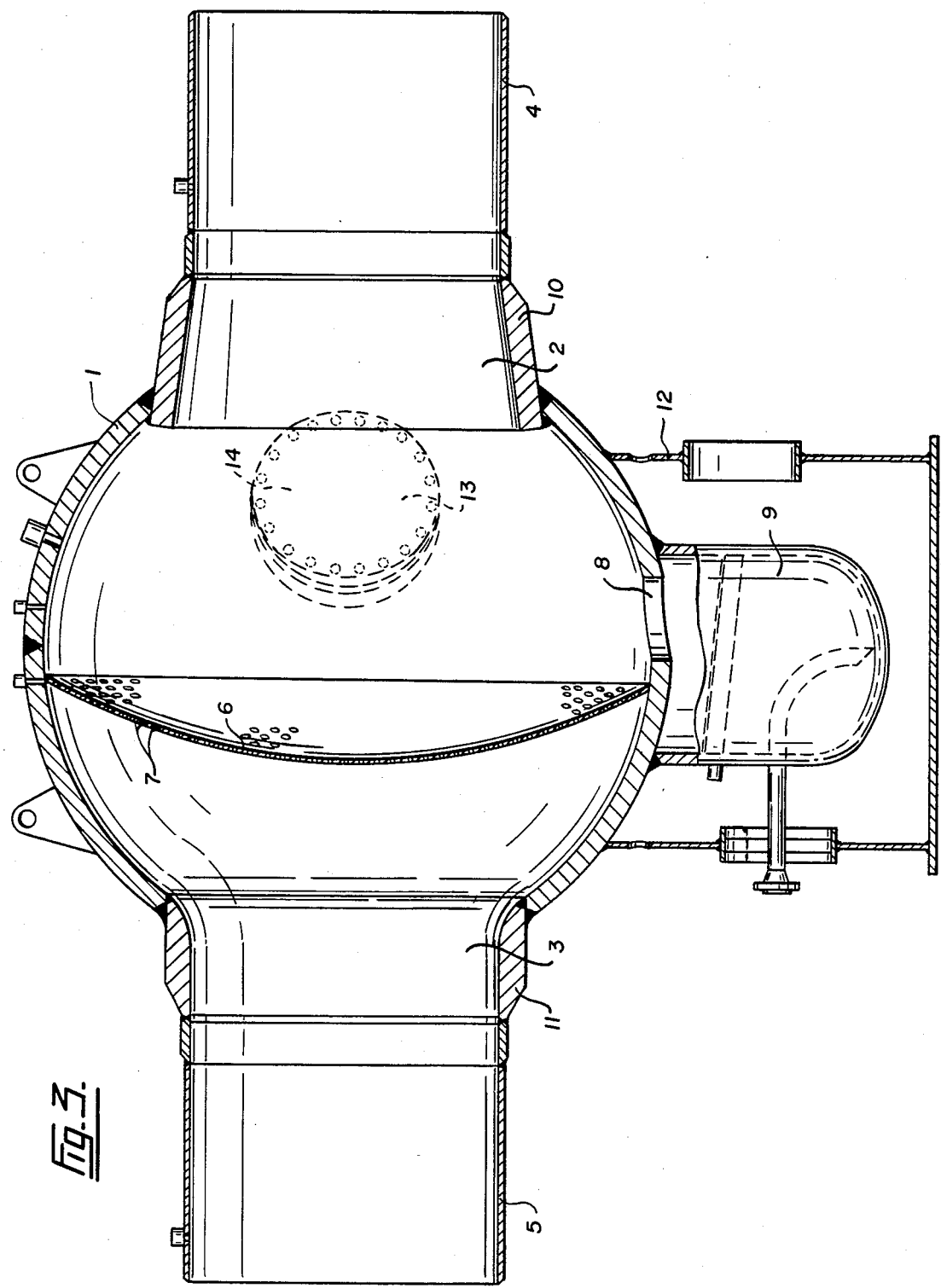
FIG. 3 is a sectional side view of the strainer of FIG. 1.

The strainer comprises a generally spherical vessel or shell 1 which is connected by inlet and outlet means 2,3 in communicating relationship with upstream and downstream ends 4,5 of a pipeline.

A concave perforated plate 6 extends across the interior of the shell 1 and is affixed thereto, as by welding around its circumference. The plate 6 is positioned between the inlet and outlet means 2,3 and is transverse to the direction of the gas flow passing through the pipeline. Perforations 7 extend through the plate 6. The perforations 7 are cut perpendicularly through the plate 6 while the latter is still flat. The plate 6 is then formed into its final concave configuration. Typically, in a plate of 88" diameter in the flat form, perforations of 0.25" diameter are staggered on 0.375" centers over the entire area. This plate is dished to an 84" radii, concave to the direction of flow.

An opening 8 is formed in the base of the shell 1 on the upstream side of the plate 6. Debris trapped by the plate 6 will drop by gravity into the opening 8. A sump 9 extends downwardly from the base of the shell 1 and extends around the opening 8. Debris dropping through the opening 8 is retained by the sump 9, from which it can periodically be cleaned out.

A manhole 13, sealed by a bolted cover 14, is formed in the shell 1 to permit access to its interior, as required for cleaning.

The inlet means 2 comprises a generally tubular, conical transition member 10 which is welded to the upstream pipeline end 4 and the shell 1. The member 10 is arranged with its smaller diameter at the pipeline end, so that the gas flow diverges as it enters the strainer. Preferably, the angularity of the wall of the member 10 is about $7\frac{1}{2}°$ or less relative to the longitudinal axis of the member.

The outlet means 3 comprises a generally tubular transition section 11 which is welded to the downstream pipeline end 5 and the shell 1. The section 10 is belled at its inner end to smoothly meet with the curved inner surface of the shell 1.

A stand 12 supports shell 1, so that it is off the ground and the inlet and outlet means 2,3 are connectable with the pipeline ends 4,5.

In operation, the gas flow, entering the strainer through the inlet means 2, expands and is well distributed and aligned to pass through the perforations 7. Entrained debris is screened from the flow by the plate 6. The pressure drop across the strainer is considerably less than with the aforementioned prior art designs.

The scope of the invention is defined in the following claims.

The embodiments of the invention in which an exclusive property or privilege are claimed is defined as follows:

1. A pipeline strainer, to be incorporated in a pipeline, which comprises:
   a substantially spherical vessel having generally aligned inlet and outlet means adapted for connection with the pipeline ends; and
   a substantially circular concave perforated plate extending transversely across the interior of the vessel and positioned between the inlet and outlet means, the plate's concave surface being its upstream surface;
   said inlet means being a generally tubular, conical member connecting the upstream pipeline end with the interior of the vessel, said conical member being adapted to cause the gas flow to diverge as it moves from the pipeline into the vessel.

2. The strainer as set forth in claim 1 wherein:
   the outlet means comprises a generally tubular transition section having a belled inner end surface which smoothly meets with the curved inner surface of the vessel.

3. The strainer as set forth in claim 1 wherein:
   the inlet means comprises a conical generally tubular transition member having an angularity in the order of about $7\frac{1}{2}°$ or less.

4. The strainer as set forth in claim 2 wherein:
   the inlet means comprises a conical generally tubular transition member having an angularity in the order of about $7\frac{1}{2}°$ or less.

* * * * *